(No Model.)

F. H. BALL.
ENGINE GOVERNING DEVICE.

No. 358,829.      Patented Mar. 8, 1887.

Witnesses.
H. L. Reynolds
Robt. H. Porter

Inventor.
Frank H. Ball
Per. Hallock & Hallock
Atty's.

(No Model.) 5 Sheets—Sheet 2.

F. H. BALL.
ENGINE GOVERNING DEVICE.

No. 358,829. Patented Mar. 8, 1887.

Witnesses.
H. L. Reynolds
Robt. N. Porter

Inventor
Frank H. Ball
Per. Hallock & Hallock
Att'ys (No Model.)

F. H. BALL.

ENGINE GOVERNING DEVICE.

No. 358,829.   Patented Mar. 8, 1887.

5 Sheets—Sheet 3.

Witnesses.
H. L. Reynolds
Robt. H. Porter

Inventor.
Frank H. Ball
Per Hallock & Hallock
Att's.

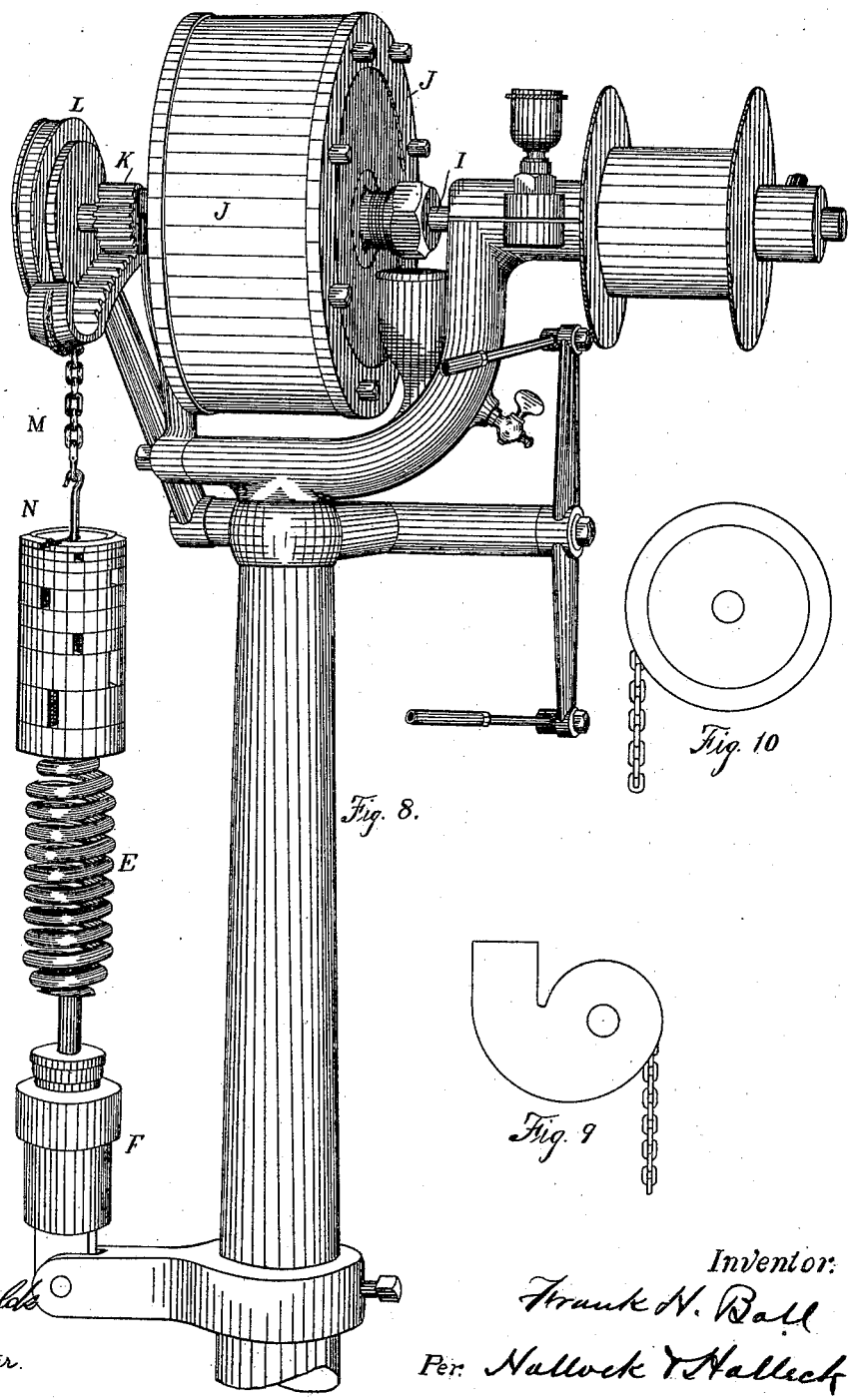

(No Model.)  
5 Sheets—Sheet 5.
F. H. BALL.
ENGINE GOVERNING DEVICE.
No. 358,829. Patented Mar. 8, 1887.
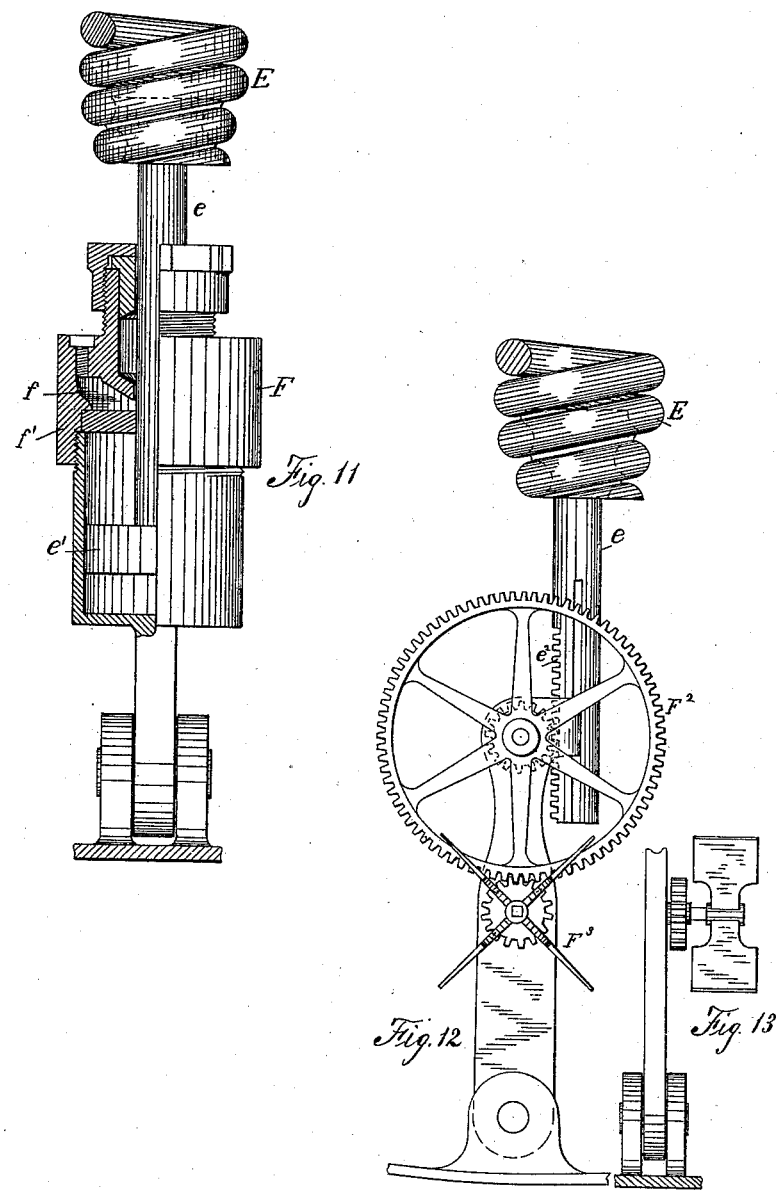
Witnesses.  
H. L. Reynolds.  
Robt. N. Porter.
Inventor.  
Frank H. Ball  
Per. Hallock & Hallock  
Att's

UNITED STATES PATENT OFFICE.

FRANK H. BALL, OF ERIE, PENNSYLVANIA.

ENGINE GOVERNING DEVICE.

SPECIFICATION forming part of Letters Patent No. 358,829, dated March 8, 1887.

Application filed May 29, 1886. Serial No. 203,051. (No model.)

*To all whom it may concern:*

Be it known that I, FRANK H. BALL, a citizen of the United States, residing at Erie, in the county of Erie and State of Pennsylvania, have invented certain new and useful Improvements in Steam-Engine Governing Devices; and I do hereby declare the following to be a full, clear, and exact description of the invention, such as will enable others skilled in the art to which it appertains to make and use the same.

My invention relates to steam engine governing devices; and it consists in certain improvements in the construction thereof, as will be hereinafter fully described, and pointed out in the claims.

My invention is applicable to any of the many types of steam-engine governing devices; and in the accompanying drawings I have illustrated it as applied to the following leading types, viz: On Sheet 1 it is shown applied to the common wheel or shifting eccentric governor. On Sheet 2 it is shown applied to the "Cummer" type of wheel governors. On Sheet 3 it is shown applied to a throttling governor of common form, known as the "Waters" governor. On Sheet 4 it is shown applied to a fluid governor of common form, known as the "Allen" governor. These illustrations are sufficient to show the universality of application of my invention in steam-engine governors; and from these illustrations and the following description of my invention any person skilled in the art of constructing steam-engines or steam-engine governors can easily apply my invention to any of the many forms of governors, and therefore further illustration is not deemed necessary.

Figure 2:
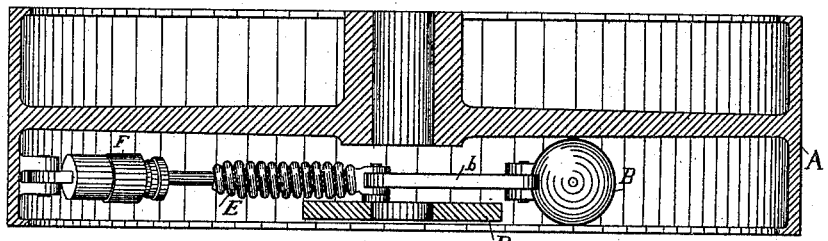
Figure 1:
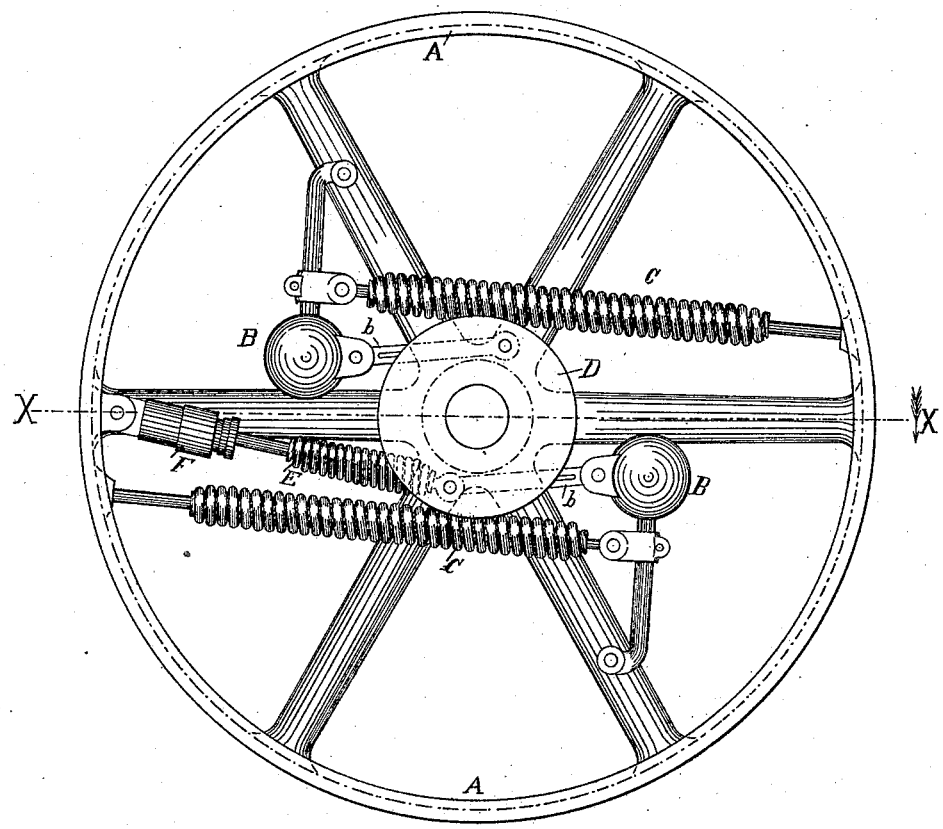

For a clear understanding of the object and purpose of my invention it is necessary to first explain the mechanical principles involved in the construction of the most perfect governors and point out the insufficiencies thereof, and then describe my construction and explain its effects. In doing this I shall only refer to the construction shown on Sheet 1 of the drawings Figure 1 is a side elevation of an ordinary wheel or shifting eccentric governor, and Fig. 2 is a horizontal section of the same on the line $x\ x$ in Fig. 1.

A is a wheel mounted on the main shaft of the engine. B B are the governor weights or balls. C C are the springs which oppose the centrifugal movement of the balls. D is a disk loose on the shaft, connected to the balls by links $b\ b$, so that any centrifugal movement of the balls will rotate this disk, and from this disk the means for controlling the steam-supply are operated by any of the well-known appliances in common use. These latter appliances I do not show, as they form no part of my invention, and their illustration is not necessary to an understanding of my invention.

In all centrifugal governing devices the weights have a certain range of motion, within which limit their motion is confined. The position nearest the shaft is called the "initial position," and the position farthest from the shaft is called the "ultimate" or "extreme" position. The full steam-supply is given when the weights are at the initial position, which supply is reduced as the weights move toward the ultimate position, and the springs which resist this outward motion of the weights are put under a certain tension when the weights are in their initial position, which tension is called the "initial tension."

It should be here noticed that centrifugal force increases or decreases directly as the distance from the center of motion increases or decreases, and that the force of a spring under tension increases or decreases directly as the amount of its deflection or departure from a position of rest increases or decreases. Therefore it will be seen that if a weight revolving around a center of motion be held centripetally by a spring whose distance of tension is such that it would be free from strain if the weight were brought to the center of motion, and whose power is equal at any one position of the weight to the centrifugal force of the weight, then the two forces will be the same and equal at all points. This condition is what is known as the full theoretic initial tension of the spring. It has been found impracticable to construct a governor with this condition, for the reason that whenever a change of speed shall cause a change of centrifugal force sufficient to move the weights from one extreme position they would immediately move to the other extreme position, and would never rest in any intermediate position, giving the engine just the required amount of steam, but would alternately throw the steam all off or all on, which action is not governing, but is commonly called "racing" or "hunting." To prevent this last-named imperfect action it has been found necessary to use somewhat less than the full theoretic initial tension, or, in other words, to have the increase and decrease of centripetal force more rapid or greater than the increase or decrease of the centrifugal force. With this adjustment it is evident that when the weight is caused to move from one position by a change of centrifugal force it will not, as before, fly immediately to its utmost limit in that direction of motion; but, on account of the differing scale or ratio of the opposing forces, the weight will stop at some intermediate point where the two forces are equal at the changed speed, and a still further change of speed will be required to move the weight again. This is what is known as a "stable" condition, because the weights seek each intermediate position with stability and remain there until a change of speed impels them to seek another position, which they again do with stability. Each intermediate position of the weights is the result of a certain speed, and each rate of speed will bring the weights to their corresponding position. This stability of action is obtained at something of a sacrifice of uniformity of speed, for, as has been seen, each intermediate position of the weights is the result of a certain rate of speed which differs from the others, and the aggregate change of speed between the extreme positions is very appreciable. The same conditions obtain in the different types of governors shown in the drawings. In all of these, except that shown in Fig. 8, centrifugal force is used, and springs or weights are used to create the centripetal force, and these springs are all so adjusted as to give stability; but in the fluid governor shown in Fig. 8 the fan-case is kept from revolving by weights, and the cord attached to said weights winds onto a scroll-shaped spool, Fig. 9, so as to secure the stability desired.

As I have before stated, my invention is applicable to all these various types of governors; and it consists in combining with the regulating parts of the governor a spring having a gradually-yielding connection or attachment at one end, which spring is so arranged with relation to the regulating parts that it will resist the movement of said parts when a change of speed takes place, and will subsequently, when the regulating parts become stable, cease to resist by reason of its yielding attachment having moved so as to slacken the tension of the spring. This spring acts as an auxiliary to the springs and weights in the various forms of governors shown, and it also acts to oppose their action.

For example, in the wheel governor shown in Fig. 1 the spring E is the spring which I provide, and the fluid dash-pot F is the yielding connection of one end of this spring. The spring E is made with open coils, and will act both by compression and extension, and it is so connected with the disk D that the weights cannot move out without straining this spring and also the springs C C; hence here it is acting as an auxiliary to the springs C C; but after it has been strained and the weights have found their orbit of motion the dash-pot yields and the tension of the spring E is relaxed. The weights, however, cannot be thrown farther out without again straining the spring E, and they cannot fall in toward the shaft without compressing the spring E; hence here we have the spring not only acting as an auxiliary to the springs C C, but also acting to oppose their action.

Figures 3, 4:
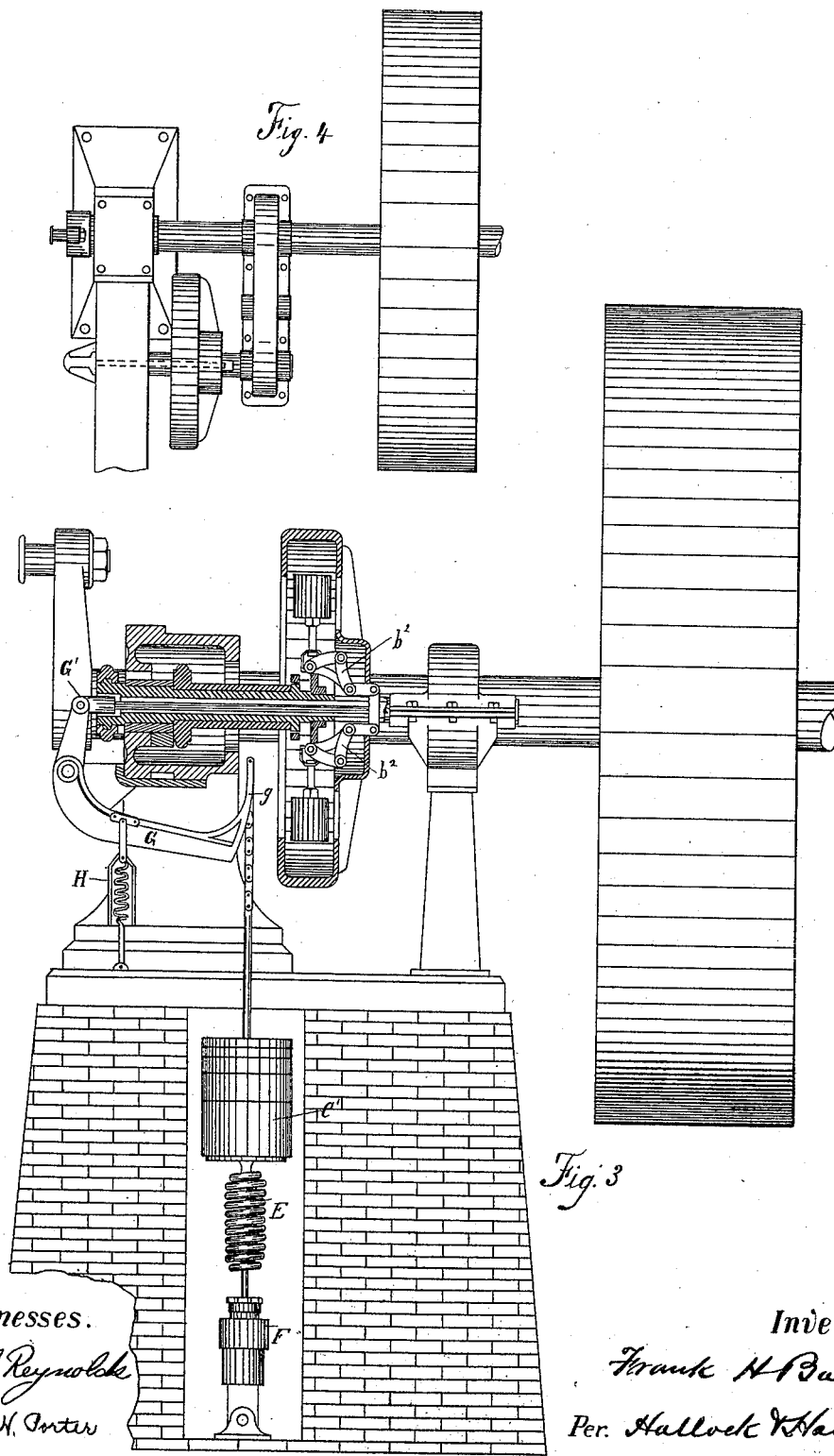

In Figs. 3 and 8 it will be seen that the spring E performs the same function as in Fig. 1.

Figure 5:
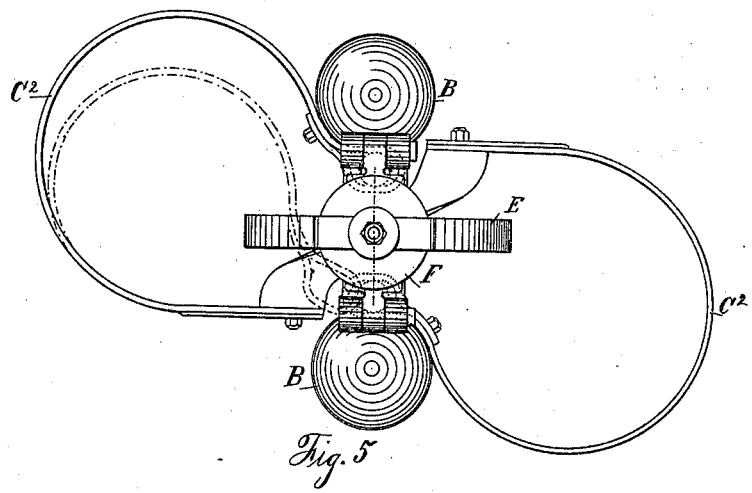
Figures 6, 7:
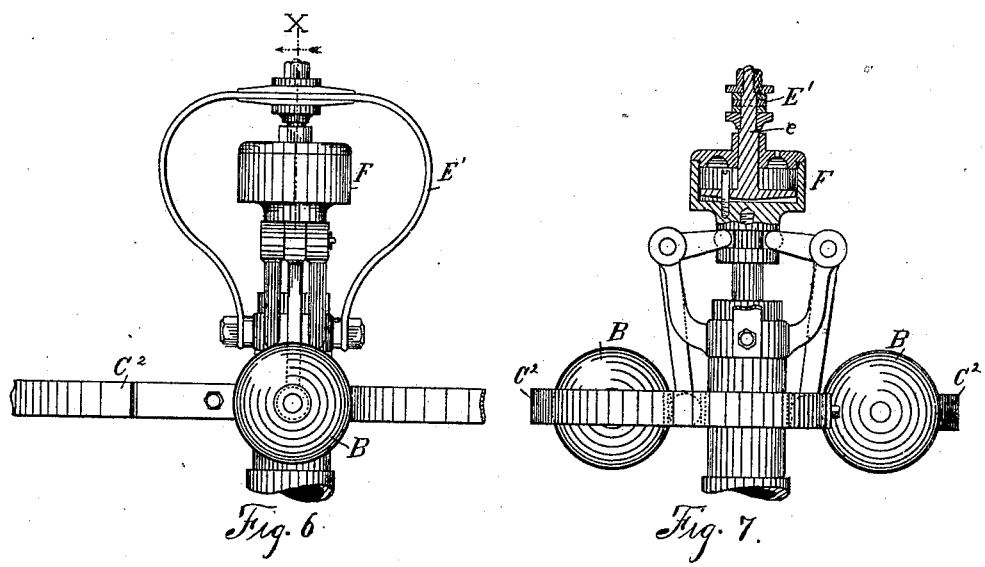

In the construction shown in Figs. 5, 6, and 7 the spring E' is of a different form; but it performs the same office as the spring E in the other construction.

Before giving a detailed description of the constructions shown it should be stated that when my invention is used the springs or weights which furnish the centripetal force should be adjusted to give full theoretical tension. Thus in Fig. 1 the springs C C are adjusted at full theoretical initial tension, and the additional centripetal force necessary to secure stability is furnished by the spring E; but when the weights become stable the yielding connection of that spring yields gradually, and as it does so the weights move a little, until they find a position which gives the exact amount of steam-supply to maintain the speed of the engine—a position the weights are unable to attain when the springs C C are adjusted with less than the full theoretical tension.

When I say, as above, that the springs or weights which furnish the centripetal force should be adjusted to give full theoretical tension, I do not wish to be limited strictly to such an adjustment, for it would be possible to make an adjustment perceptibly less than full theoretical tension, but not enough less to give stability and secure all the benefits of my invention. Any such variation from exactly full theoretical tension would either be the result of inaccurate adjustment or would be effected purposely for the purpose of evading the language above referred to. An adjustment giving absolute theoretical tension is preferable; but anything less than that and not sufficiently less to give stability is within the scope of my invention, which consists in making an unstable governor stable by the use of an auxiliary spring having a yielding connection, as above described.

The construction and application of my improvement is as follows: The spring E is an open-coil spring, and will resist both compression and extension. It is connected at one end to the regulating parts, as the circumstances require, and at the other to a fixed point through the medium of a dash-pot or other gradually-yielding connection.

In Fig. 11 the construction of the dash-pot is shown, and in Figs. 12 and 13 a substitute for the dash-pot, in the form of a fan-escapement, is shown. Of course other well-known equivalents of the dash-pot may be employed, but require no illustration, as they will readily suggest themselves to a mechanic.

The dash-pot F is constructed as follows: It is a fluid dash-pot, consisting of a case or cylinder with a perforated piston, $e'$, and a piston-stem, $e$, to which the spring E is attached. A partition, $f'$, divides the case and forms an outer chamber, $f$, into which the fluid displaced by the entrance of the stem $e$ into the main cylinder-chamber can pass.

The fan-escapement shown in Figs. 12 and 13 will be readily understood, as it is a well-known form of escapement. A rack, $e^2$, on the stem $e$ meshes with a small pinion on the shaft of the large pinion $F^2$, which meshes with a small pinion on the shaft of the fan $F^3$. It will be readily seen that with either of these devices as an attachment for the spring E a sudden drawing on the spring will extend it; but if the force continues the yielding connection will gradually move and the strain on the spring will be relaxed, and also if the spring is suddenly compressed and the force continues the yielding connection will give way and the spring will expand to its normal condition.

A connection for the spring E which will at first resist and afterward gradually yield is essential to my device; but the form or type of device which gives this gradual yielding attachment is immaterial. The dash-pot is the preferable form, especially in wheel governors; but the fan may be used with good effect in the other types of governors shown.

The application of my invention to a wheel governor is shown in Figs. 1 and 2. The dash-pot is attached to the wheel, and the opposite end of the spring E to the disk D or other part moved by the action of the weights. The location of the spring E and dash-pot is immaterial, so it is so connected as to resist the movement of the regulating parts, and subsequently, when they become stable, will relax its resistance.

In the type of governor shown in Figs. 3 and 4, which is known as the "Cummer governor," the centrifugal action of the balls B B is resisted by the weight C' and the spring H, acting on the lever G, which is connected by the rod G' and levers $b^2\ b^2$ with the arms of the balls B. As the cord which suspends the weights C' winds on an arc, $g$, which is concentric with the fulcrum of the lever G, the spring H is necessary to resist the increase of centrifugal force which the balls B acquire as they move from the shaft. As this governor is ordinarily made, the spring H is given sufficient additional power to give the balls B that stability which is obtained in such a construction as that in Fig. 1 by giving the springs C C less than the full theoretical initial tension.

In applying my device to the Cummer governor I give the spring H only so much power as is required to counteract the increase of centrifugal force acquired by the balls as they move from the shaft, and thus secure the equivalent of full theoretic tension, and I then connect my spring E and dash-pot F with the weight C', as shown in Fig. 3, where it will resist the movement of the regulating parts until they become stable, and then will yield and cease to resist, giving precisely the same effect I have before explained in connection with the construction shown in Fig. 1.

In the construction shown in Figs. 5, 6, and 7, which is a throttling governor of common form, the spring E' corresponds in function with the spring E in the previous figures. Here I show a dash-pot attached to a part of the governor which has a vertical movement caused by the action of the balls B, and the spring E' is attached to a part of the governor which has no vertical movement and bows or arches over the top of the governor, and takes hold of the piston-rod $e$ and restrains its movement. In this construction the springs $C^2\ C^2$, which correspond in function with the springs C C in Fig. 1, should be adjusted at full theoretic initial tension. The centrifugal movement of the balls B B is restrained by the spring E' with precisely the same effect as are the balls B in the construction shown in Fig. 1 by the spring E.

The governor shown in Fig. 8 is what is known as a "fluid governor," and is well understood by mechanics and needs no particular explanation here. A fan on the shaft I rotates in the case J, which contains a fluid, and is left free to move within limits by the rotative action of the fan and fluid. Any such rotative movement of the case is restrained by the weight N, which is suspended by the chain M from a spool, L. In order for the case to move rotatively, it must wind the chain M onto the spool. As ordinarily constructed the spool is made scroll form, as in Fig. 9, to cause the weight to exert a constantly-increasing resistance to the rotation of the case. In applying my invention to this type of governor I make the spool round, as in Fig. 10, and attach my spring and its yielding attachment to the weights N. With a round spool and a proper weight, N, we have the equivalent of full theoretic initial tension, as explained in connection with the wheel governor in Fig. 1, and with my spring and its elastic connection we have the additional force, which will give stability, and at the same time allow the regulating parts to seek such a position as will give uniformity of speed.

I intend hereafter to apply for patents claiming specifically the various constructions here shown and not here claimed specifically, and hereby reserve the right so to do.

I am aware that an auxiliary spring having a dash-pot connection has been applied to engine-governors, but not for the purpose, nor in the manner, nor under the conditions I apply such a spring. Such application has been heretofore used for the purpose of making the governor perfectly astatic, or for preventing the weights from moving more easily in one direction than in the other. See, for example, German Patents Nos. 3,875 and 6,557, and English Patents No. 991 of 1865 and No. 3,416 of 1866. The said patents do not describe the rationale of my invention. My auxiliary spring resists the action of the weights the same whether moving in or out, and it is applied for the purpose of making an astatic governor stable—a use not contemplated or described in either of said patents.

What I claim as new is—

1. In a steam-engine governing device wherein the regulating parts are adjusted so as to give substantially an equilibrium to the opposing forces, the combination, with said regulating parts, of a spring having a gradually-yielding connection applied to resist the action of said regulating parts, substantially as and for the purposes mentioned.

2. In a steam-engine governing device, the combination, substantially as shown, of a wheel upon the engine-shaft, centrifugally-movable weights adjusted in said wheel, springs connected with said wheel, and weights so adjusted as to substantially counterbalance the centrifugal force generated by the rotation of said weights around the shaft, and an auxiliary spring having a yielding connection at one end applied to resist both the inward and outward movement of said weights, for the purposes set forth.

In testimony whereof I affix my signature in presence of two witnesses.

FRANK H. BALL.

Witnesses:
 ROBT. H. PORTER,
 C. SWALLEY.